United States Patent [19]

Dayen

[11] 4,201,753
[45] May 6, 1980

[54] FLUE GAS DESULFURIZATION PROCESS

[75] Inventor: William R. Dayen, Reading, Pa.

[73] Assignee: Gilbert Associates, Inc., Reading, Pa.

[21] Appl. No.: 872,601

[22] Filed: Jan. 26, 1978

[51] Int. Cl.$^2$ .......................... C01B 17/00; C01C 1/24
[52] U.S. Cl. ...................................... 423/242; 423/545
[58] Field of Search ............... 423/242, 244, 166, 545, 423/551, 181

[56] References Cited

U.S. PATENT DOCUMENTS

| | | | |
|---|---|---|---|
| 3,851,042 | 11/1974 | Minnick | 423/244 |
| 3,879,521 | 4/1975 | Anderson | 423/242 |
| 3,896,214 | 7/1975 | Newman | 423/166 X |
| 3,932,587 | 1/1976 | Grantham et al. | 423/242 |

*Primary Examiner*—O. R. Vertiz
*Assistant Examiner*—Gregory A. Heller
*Attorney, Agent, or Firm*—William J. Ruano

[57] ABSTRACT

A method of desulfurizing carbonaceous fuel, such as coal and oil containing sulfur. The fuel is ignited in a boiler combustion zone and a saturated solution of potassium carbonate and potassium hydroxide is sprayed into the flue gas stream immediately downstream of the boiler combustion zone at a sufficiently high temperature to volatilize said sprayed solution to an ionic form. In the presence of excess oxygen at a temperature in excess of 1315° C., the sprayed flue gas combines to form potassium sulfate particulates which are collected and removed dry, along with flyash particles, by mechanical or electrostatic precipitator equipment from the flue gas stream. The insoluble ash is separated from the soluble potassium sulfate by water elution. The solubilized potassium sulfate is separated by ion exchange mechanisms with the potassium, as potassium hydroxide, being recycled to the head of the system and the sulfate being reacted to form ammonium sulfate.

10 Claims, 2 Drawing Figures

FLUE GAS DESULFURIZATION PROCESS

An object of this invention is to reduce hazardous and undesirable environmental discharges of sulfur dioxide to or below the required regulatory limits by a most economical means.

Sulfur dioxide ($SO_2$) is a product of combustion of fossil fuels, particularly coal and oil, which contain sulfur. $SO_2$ has been deemed an environmental and health hazard. The Environmental Protection Agency, as authorized by the Clean Air Act of 1970, has established a current discharge-to-the-atmosphere limit of 1.2 pounds of $SO_2$ per million Btu, fired.

Ammonium sulfate and ash are the only end products of my novel process. Ammonium sulfate is a well known and widely used fertilizer with its nitrogen and sulfur content being essential to plant growth. Clean washed coal ash is presently an environmentally acceptable discharge, largely used as landfill.

CURRENT BACKGROUND OF FLUE GAS DESULFURIZATION

As of May 1976, some 38 Flue Gas Desulfurization (FGD) processes were being promoted by more than 100 sponsoring organizations and supported by more than 90 equipment manufacturers.

Those FGD processes which produce calcium sulfite/sulfate sludges containing ash as the end product have an estimated overall annualized cost in excess of $0.50 per million Btus fired and an estimated initial capital investment in excess of $100.00 per kilowatt of installed capacity. These costs do not include the values for site acquisition, site preparation and site rehabilitation for disposal or the operating or capital costs for pumping the sludges to the disposal site.

Those FGD processes which produce saleable products, such as anhydrous sulfur dioxide, sulfuric acid or elemental sulfur, have an estimated annualized cost of $0.35 per million Btus fired, with full market price credit of the by-products. The estimated initial capital investment cost in excess of $150 per kilowatt of installed capacity.

The consumption of coal combusted as fuel in the United States in 1976 has been estimated at 645 million tons. The average sulfur content of the coal is placed at 2.4 percent. To remove some 27 million tons per year of $SO_2$ from the atmospheric discharges by any combination of presently promoted FGD processes, the out of pocket cost to the consumers in the United States would be between 4 and 8 billion dollars in 1976.

The numerous wet scrubbing FGD processes, producing calcium sulfite/sulfate sludges containing ash, cause the combustion flue gasses to pass through alkaline solutions, such as sodium hydroxide, sodium carbonate, calcium hydroxide, calcium carbonate or magnesium hydroxide. These solutions absorb 60 to 90 percent of the $SO_2$ in the entering flue gas stream, forming sulfite/sulfate salts. Secondary process loops react these scrubber solutions to form precipitates. The precipitates are then concentrated to a sludge which is transported to a prepared, impermeable, permanent disposal site which must be rehabilitated for recreational, agricultural, industrail or residential uses.

The major disadvantages of the wet scrubbing FGD processes are:

1. The very large volumes, 60 gpm per MWe of scrubbing solution are required for recirculation throughout the primary scrubbing loop, continuously.
2. The volume of makeup water required is substantial, ranging from 1 to 5 gpm per megawatt.
3. The chemistry of the several loops is complex and results in impervious-to-water scale formation if precise chemical equilibriums are not constantly maintained.
4. Large quantities of flue gas heat must be dissipated in water slurries to effect $SO_2$ removal by absorption and then the cooled flue gases must be reheated in order to effect atmospheric discharge up the stack.
5. The large volume of sludge generated, one to two cubic feet per megawatt-hour, have no major continuing market potential.
6. The large quantities of caustic, soda ash, lime, limestone or dolomite required to produce the chemical sludges are rarely within economical shipping distance of the use site.
7. The extensive land acreage required for the disposal of the chemical sludges are rarely adjacent to the existing power generating plant site, and are socio-economically and environmentally unacceptable for this purpose.

The primary process loops of the several dry FGD processes which produce marketable end products, such as anhydrous sulfur dioxide, sulfuric acid and elemental sulfur, cause the $SO_2$ containing flue gasses to pass through sulfur dioxide absorbants, such as molten sodium carbonate, sodium aluminate or activated carbon and/or react with oxidizing catalysts, such as magnesium oxide, copper oxide and vanadium pentoxide. Secondary process loops regenerate the absorbants or catalyts, releasing the $SO_2$ in a reasonably pure form, which, in turn, is further reacted to form the marketable product.

The major disadvantages of the dry FGD processes are:

1. The unfavorable chemical equilibrium reaction rates.
2. The high temperature and high BTU requirements of the primary reaction loops.
3. The high temperature, high BTU and high pressure requirements of some secondary regeneration loops.
4. The higher overall efficiency decrease in the net station output.
5. The replacement costs of the absorbant or catalyst.
6. Impure and/or dilute end products.
7. The limited geographical areas of profitable marketibility of the end by-products.

BRIEF SUMMARY OF THE INVENTION

A. EASE OF STARTUP

The startup of my novel process is simple and uncomplicated, even when retrofitted to existing facilities. A state of equilibrium is not required. Immediately following the ignition of the fuel, a saturated solution of potassium carbonate ($K_2CO_3$) is sprayed into the flue gas stream immediately downstream of the combustion zone.

The amount of $K_2CO_3$ introduced is dependent upon the concentration of the solution, the sulfur content of the coal, the heating value of the coal, and the emission limits of $SO_2$ which can be discharged to the atmosphere.

The weight of the coal fired, including the moisture content of the coal, is multiplied by twice the sulfur content of the coal, as determined by the ultimate coal analysis, is equal to the weight of the $SO_2$ entering.

The allowable weight of the $SO_2$ discharging to the atmosphere is equal to the weight of coal in, with the moisture included, times the heating value of the coal as fired time the emission limit of $SO_2$ per million BTU's fired.

The weight of $SO_2$ entering, minus the weight of the $SO_2$ discharging to the atmosphere, is multiplied by the mole weight ratio of $K_2CO_3$ to $SO_2$, 138:64 and divided by the concentration of $K_2CO_3$ in the saturated solution equals the weight of saturated solution being injected into the combustion zone.

In normal operations, the $K_2CO_3$ is largely replaced by the potassium hydroxide (KOH) solution regenerated in the process. The quantity of the saturated KOH solution required for injection just downstream of the combustion zone is calculated in the same manner as the saturated solution of $K_2CO_3$ except that the mole weight ratio of KOH to $SO_2$ is 56:64 and the concentration of KOH in a saturated solution is higher than $K_2CO_3$.

In normal operations, the quantity of $K_2CO_3$ added as makeup is calculated so as to be equivalent to the potassium losses from the process.

B. REMOVAL OF $SO_2$

A temperatures above 1315° C. (2400° F.), the potassium ion ($K^+$) in potassium compounds, such as $K_2CO_3$, KOH and $K_2SO_4$, completely dis-associate. Flue gas reactions between excess $K^+$, excess oxygen ($O_2$) and limited amounts of $SO_2$ have been proved in magnetohydrodynamic experimentation to result in more than 99 percent removal of $SO_2$ from the flue gas. Conversely, it has been shown that excess $SO_2$ and excess $O_2$ results in the complete utilization of $K^+$.

The $K^+$, $SO_2$ and $O_2$ react to form $K_2SO_4$ in an ionic form at the elevated temperatures and then condense to form particulates when the flue gases are cooled to temperatures in the range of 200° C. (390° F.).

Thus by the addition of sufficient $K^+$ in the form of saturated $K_2CO_3$/KOH solution it is possible to reduce the atmospheric discharge of $SO_2$ to very low values. Conversely, by limiting the quantity of $K^+$ which is injected downstream of the combustion zone, the $SO_2$ discharged to the atmosphere can be increased or decreased at will. The removal of $SO_2$ by the present process, becomes a management control functionl directly dependent of the sulfur content of the coal and the local regulations for $SO_2$ emissions.

EASE OF PARTICULATE REMOVAL $K_2SO_4$ particulates in themselves are easily removed by conventional electrostatic precipitators, since they readily accept an electrical charge.

A large part of the $K_2SO_4$ will condense on the small flyash particles present in the flue gases, thus making the flyash particles larger and more susceptible to removal by mechanical cyclonic devices and conventional electrostatic precepitators.

Particulate removal efficiencies of 99.9975 percent can be anticipated when sufficient $K^+$ in the form of $K_2SO_4$, $K_2CO_3$ or KOH is present without major modification of present conventional electrostatic precipitator equipment.

D. EXCELLENT ION EXCHANGE EQUILIBRIUMS

The ion exchangers in the present process use only anion resins. The affinity of the sulfate ion ($SO_4^=$) to exchange with the hydroxyl ion ($OH^-$) is greater than any other combination of negatively charged ions. The exchange of the $SO_4^=$ for the $OH^-$ occurs during the "on-stream" step of the process, when the $K_2SO_4$ solution is passing through the ion exchanger.

Conversely, the $K^+$ rejection to the anion resin is exceeded only by lithium, hydrogen and ammonium ions. Very little $K^+$ remains physically attached to the anion resin and what remains is rinsed off early in the "rinse cycle."

Ammonium hydroxide is used to regenerate the anion resin. The displacement reaction between the $SO_4^=$ and the regenerant ion, $OH^-$, could only be greater if the fluoride ion were the regenerant ion.

As with the $K^+$ ion, the ammonium ion ($NH_4^-$) is almost totally rejected by the anion resin both chemically and physically.

E. PROBABLE REMOVAL OF OXIDES OF NITROGEN

All flue gases contain some form of nitrogen oxides ($NO_x$). Little magnetohydrodynamic analytical research has been reported on the reactions of $K^+$ with $NO_x$ at elevated temperatures. Expert opinion suggests that potassium nitrate ($KNO_3$) will form and precipitate in the same manner as does $K_2SO_4$ in the flue gas stream. Thus it is highly probable that a significant reduction in $NO_x$ emissions to the atmosphere will be a result of the present FGD process.

If $KNO_3$ precipitates or condenses in the flue gas stream, the ion exchange regeneration step in the process will be altered in order to recover the $NO_3^-$ in the form of $NH_4NO_3$. The $NH_4NO_3$ would become a most valuable addition to the $(NH_4)_2 SO_4$.

F. FLUE GAS REHEAT NOT INVOLVED

The present process does not in any way reduce the flue gas temperatures found at the exit breaching of the electrostatic precipitator, thus does not require the reheat energy required for all types of wet scrubber $SO_2$ removal processes.

Also the present process does not require the pumping of inordinate quantities of scrubbing solutions and waste slurry solutions such as are evident in the process flows of the present wet and dry $SO_2$ removal systems.

None of the presently promoted flue gas desulfurization systems have less than a 10% cost of the net-station-input-energy for pumping and reheat, many are estimated at 15% and higher. The present system is presently estimated to require less than 1% of the net-station-input-energy.

G. CAPITAL INVESTMENT COSTS REDUCED.

The capital investment required for the installation of wet type $SO_2$ scrubbers and required accessories, including disposal site aquisitions, approach $250 per kilowatt for new plants. Retrofitting new wet scrubber equipment to existing plants and acquiring the necessary land for disposal adjacent to established industrail areas will further escalate the cost per kilowatt.

It is presently estimated that the installation of equipment for the present process will cost $25 per kilowatt for new or existing plants. No disposal site land is required. No additional equipment is required between the dust collection/electrostatic precipitator equipment and the stack. The space required for the ion exchangers, surge tanks and evaporators in the present process is some ten times less than the space required for the scrubber modules, recycle tanks, surge tanks, thickeners, sludge solidification equipment and a complete lime system, probably including a calciner which are required for a wet type $SO_2$ scrubbing process.

DETAILED DESCRIPTION

Figure 1A:
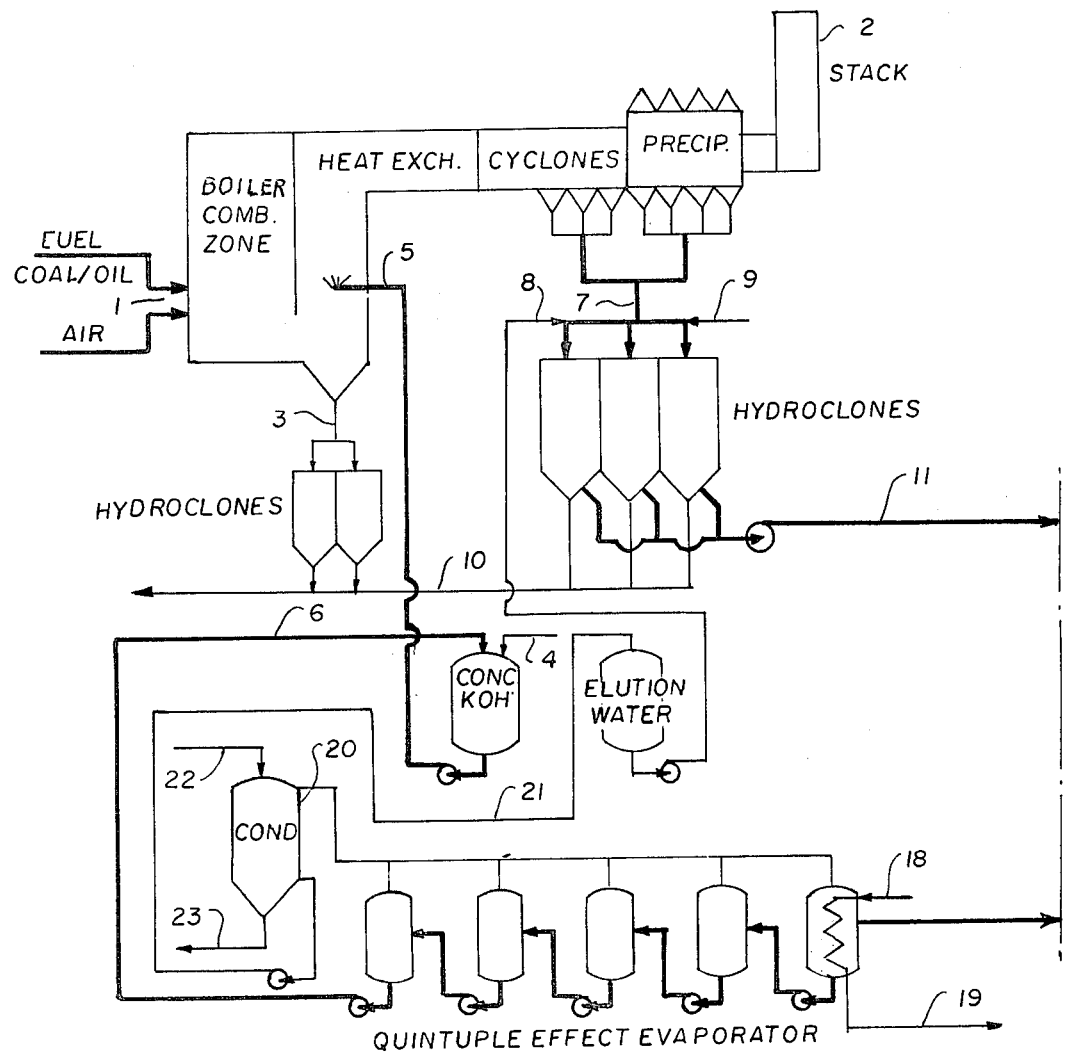
Figure 1B:
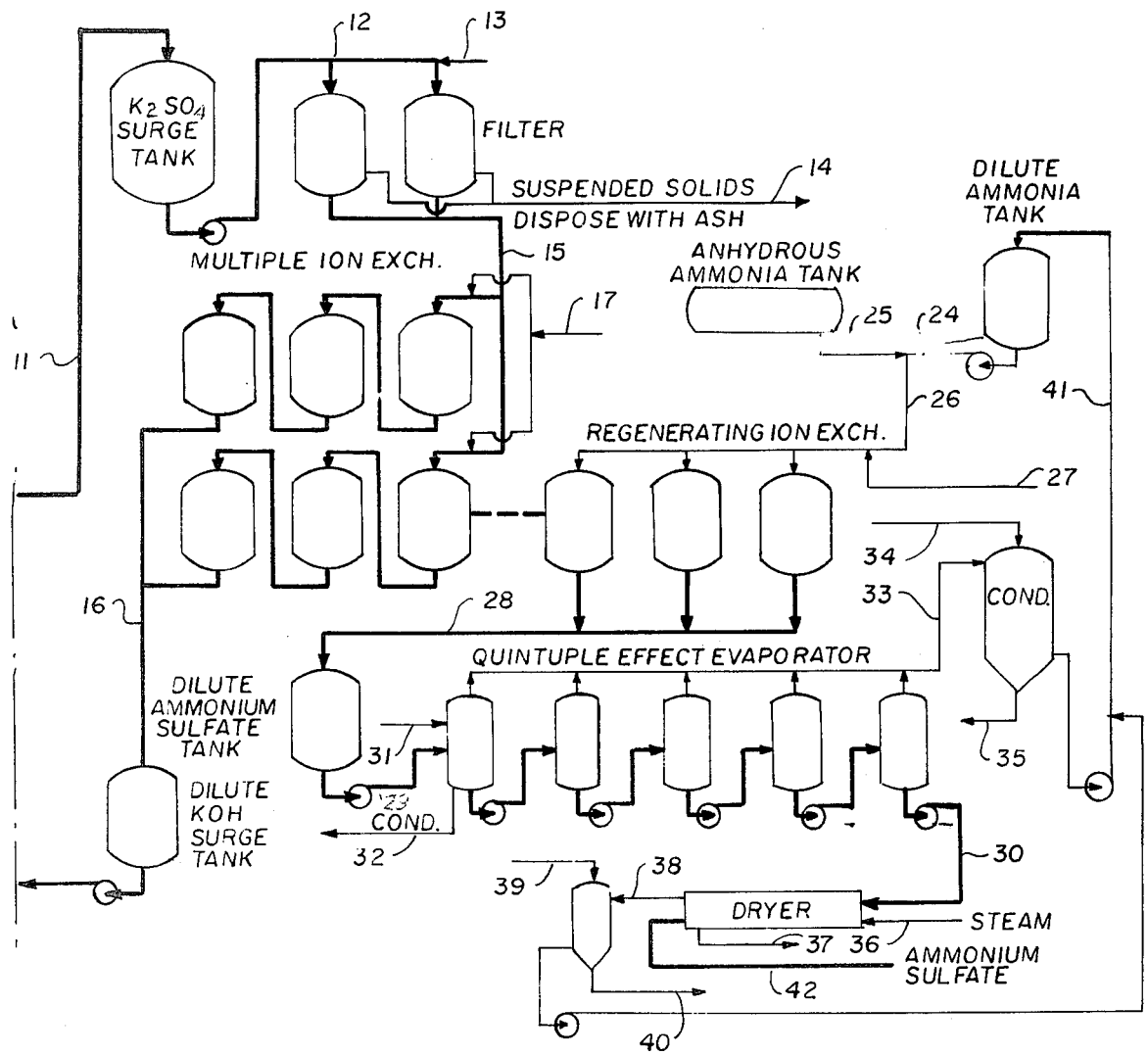

FIGS. 1 and 1A are a diagrammatic pictorial showing the interrelationship of major equipment components required for the present flue gas desulfurization process.

A. SULFUR DIOXIDE REMOVAL

Referring more particularly to FIGS. 1 A & B of the drawing, sulfur containing fuels and heated air are introduced at 1, ignited and combusted in the BOILER COMBUSTION ZONE. The products of combustion traverse passageways containing heat exchangers and particulate removal equipment. The gases and moisture vapors and some minor amounts of particulate discharge up the stack at 2 to the atmosphere.

Sulfur dioxide is a product of combustion. The atmospheric discharge of $SO_2$ is currently limited to 1.2 pounds of $SO_2$ per million BTU fired by Federal regulation for new plants. The weight of $SO_2$ to be removed from the flue gas stream is twice the weight of the sulfur in the fuel entering at 1, minus the allowable weight limit of $SO_2$ discharging at 2.

The weight of the ash entering at 3 will vary from 25 to 90% of the ash content of the entering fuel. The weight discharged is dependent of the character of the fuel being fired and the configuration of the boiler combustion zone and to a minor extent on the type of ash/slag quencher/removal equipment. The water quenched ash/slag exiting at 3 has in the past been an environmentally acceptable discharge.

The initial startup of the present flue gas desulfurization process requires a saturated solution of a potassium compound be prepared. Preferably $K_2CO_3$, entering at 4 is mixed with water to form a saturated solution of 60% $K_2CO_3$ at 100 C in the CONC. KOH SURGE TANK. The basis for calculations for the pounds of $K_2CO_3$ for a given fuel has been previously presented. The $K_2CO_3$ solution is sprayed into the flue gas stream immediately downstream of the combustion-zone-ash/slag-removal-equipment at 5. The flow of the $K_2CO_3$ solution is established immediately after the ignition of the fuel is accomplished.

Once the present process is in full operation, the amount of $K_2CO_3$ added at 4 is reduced to the amount of the $K^+$ lost from the system.

The saturated solution sprayed into the flue gas stream under normal operating conditions is mostly KOH, entering at 6.

As the sprayed potassium compounds in saturated solution, KOH and $K_2CO_3$, enter the flue gas stream, they quickly volatilize to an ionic form. In the presence of excess oxygen ($O_2$) and at temperatures in excess of 1315 C, the K, $SO_2$ and $O_2$ combine to form $K_2SO_4$. As the vapors and flue gases cool, the $K_2SO_4$ condenses, first on the surface of flyash, then as a $K_2SO_4$ particulate. The amount of flyash entering the cyclones and electrostatic precipitators can vary from 10 to 90% of the ash content of the fuel fired. Rarely do standard electrostatic precipitators have removal efficiencies of more than 99% on flyash particulates. The efficiency of a standard electrostatic precipitator will be improved to the range of 99.75% when the present process is used since every particle will be coated with, or will be a $K_2SO_4$ particle, and all particles containing a $K^+$ ion will accept an electrostatic charge, thus will be removed from the flue gas stream by the precipitator. Nearly all the precipitates will discharge at 7.

B. RECOVERY OF POTASSIUM SULFATE

The particulates discharging at 7 are water quenched to dissipate the entrained heat and to afford hydraulic conveyance to the solid separation equipment in which successive predetermined volumes of water from 8 are passed through the collected particulates to effect complete solubilization of the $K_2SO_4$.

Predetermined volumes of FINAL ELUTION WATER are introduced at 9 to reduce the potassium content of the solids existing at 10 to environmentally acceptable levels.

The dilute and impure $K_2SO_4$ solutions exiting periodically from the HYDROCLONES at 11 are hydraulically transferred to the $K_2SO_4$ SURGE TANK. The $K_2SO_4$ SURGE TANK is continuously agitated. Proper operation of the surge tank permits relatively constant flow and concentration to following operations.

The dilute and impure $K_2SO_4$ solution is filtered, entering at 12 to effect the removal of fine particles of flyash which have passed through the rough type of filtration effected in the solids separation equipment.

Controlled volumes of fresh FINAL WASH WATER are introduced from 13 to reduce the potassium content of the filtered suspended solids removed, to environmentally acceptable levels for discharge. The discharge of the suspended solids at 14 is combined with the discharges at 3 and 10 for disposal.

C. POTASSIUM SULFATE ION EXCHANGED TO POTASSIUM HYDROXIDE

The filtered, dilute and impure $K_2SO_4$ solution enters the "on-stream" strong or weak base anion resin exchangers at 15. A dilute, relatively pure KOH solution discharges at 16 to the DILUTE KOH SURGE TANK.

The ion exchangers "on-stream" are operated in parallel trains of three or more ion exchangers in series, in order to effect 99.99% removal of the $SO_4^=$ ion from most of the other negatively charged ions. The percentage of the positively charged ions, mostly $K^+$ retained on the anion resin is exceedingly small following the one bed volume displacement of fresh FINAL RINSE WATER introduced from 17.

D. CONCENTRATION OF POTASSIUM HYDROXIDE

The dilute KOH solution in the DILUTE KOH STORAGE TANK is discharged to a conventional MULTIPLE EFFECT EVAPORATOR. A saturated or super saturated solution of KOH discharges for the evaporator at 6 to the CONC. KOH SURGE TANK.

Diagramatically, the steam required to effect the evaporation of the KOH solution enters at 18, discharging at 19; the steam vapors from the evaporation of the KOH solution enter a SURFACE TYPE CONDENSER 20, discharging at 21; the cooling water to condense the steam vapors of the evaporation of the KOH solution enter the shell of the SURFACE TYPE CONDENSER at 22, discharging at 23.

E. OPERATIONAL SEQUENCE OF THE ION EXCHANGE UNITS

The "head" ion exchange unit of a series train in the "on-stream" mode is hydraulically transferred to the "regeneration" mode when the "head" unit has become saturated with $SO_4^=$ ions, exchange having been effected with the $OH^-$ ions. The ion exchange unit next in the order of progression becomes the "head" unit, and concurrently a freshly "regenerated" ion exchange unit is placed in the "on-stream" mode at the end of the series train.

The first step of the "regeneration" sequence is to displace the $K_2SO_4$ solution contained in the unit with fresh water. The $K_2SO_4$ solution and rinse water are directed to the $K_2SO_4$ SURGE TANK.

The second step of the "regeneration" sequence is the introduction of $NH_4OH$ solution. The $NH_4OH$ solution continues to flow through the exchanger until all of the $SO_4^=$ ions have been exchanged for the $OH^-$ ions.

The third step of the "regeneration" sequence is to displace the $NH_4OH$ solution with fresh water.

The $(NH_4)_2SO$ solution is directed to the DILUTE AMMONIUM SULFATE TANK. The $NH_4OH$ solution and the rinse water are directed to the DILUTE AMMONIA TANK.

Backwashing is the final step in the regeneration sequence. Backwashing removes resin fines and insoluble precipitates which may cause excessive pressure drop across the exchanger. Backwashing is not accomplished unless required. Multiple ion exchange units may be in the same or different regeneration steps concurrently.

F. AMMONIUM SULFATE PRODUCED

Dilute ammonium hydroxide solution, from the DILUTE AMMONIA TANK at 24, is mixed with anhydrous ammonia from the ANHYDROUS AMMONIA TANK at 25 in such a manner to form at least a 4% ammonium hydroxide solution at 26. The ammonium hydroxide solution passes through the ion exchange units as required.

The ammonium ion ($NH_4$) passes through the ion exchanger unhindered. The hydroxyl ion ($OH^-$) displaced the $SO_4^=$ ion which was exchanged onto the resin during the "on-stream" mode.

The solution issuing at 28 to the DILUTE AMMONIUM SULFATE TANK is largely dilute ammonium sulfate with a minor amount of ammonium hydroxide.

G. CONCENTRATION OF AMMONIUM SULFATE

The dilute ammonium sulfate solution in the DILUTE AMMONIUM SULFATE TANK is discharged at 29 to a conventional MULTIPLE EFFECT EVAPORATOR. A super saturated solution of ammonium sulfate discharges from the evaporator at 30.

Diagrammatically the steam required to effect the evaporation of the ammonium sulfate solution enters the evaporator at 31, discharging as condensate at 32; the steam vapors of the evaporation of the ammonium sulfate solution enter the SURFACE TYPE at 33, discharging as very dilute ammonium hydroxide at 41 to the DILUTE AMMONIA TANK; the cooling water for condensing the steam vapors of the evaporated ammonium sulfate solution enter the shell of the SURFACE TYPE CONDENSER at 34, discharging at 35 back to the cooling water source.

H. DRYING AMMONIUM SULFATE

The supersaturated solution of ammonium sulfate solution discharging from the MULTIPLE EFFECT EVAPORATOR at 30 enters a conventional AMMONIUM SULFATE DRYER, discharging at the optimum moisture content for ammonium sulfate for storing, bagging or bulk shipment at 42.

Diagrammatically the steam required for removing the water from the super saturated ammonium sulfate solution entering the dryer at 30, enters the dryer at 36, discharging as condensate at 37. The water vapors driven of the supersaturated solution of ammonium sulfate as steam enter the SURFACE TYPE CONDENSER at 38 and discharge as water containing some ammonia at 41 to the DILUTE AMMONIA TANK.

Thus it will be seen that I have provided a highly economical and efficient process for desulfurizing flue gases,- also for providing end products which are highly beneficial, namely aluminum sulfate as a fertilizer and clean coal ash as an aggregate,- also I have provided a novel process wherein the amount of desulfurization may be accurately controlled in accordance with the sulfur content of coal or oil, whereby atmospheric discharge of $SO_2$ can be reduced to extremely low values, -far below legal requirements.

While I have illustrated and described a single specific embodiment of my invention, it will be understood that this is by way of illustration only and that various changes and modifications may be contemplated in my invention and within the scope of the following claims.

I claim:

1. The method of desulfurizing the flue gas products of combustion of carbonaceous fuel, comprising effecting the essentially complete combustion of said fuel in a combustion zone, spraying an impure solution containing mostly $K_2CO_3$ and KOH into the flue gas stream at low pressure immediately downstream of the combustion zone in a zone where the temperature is sufficiently high to vaporize, volatilize or decompose the potassium compounds present to form an ionic form of potassium, thereafter reacting the $SO_2$ present in the flue gas stream with the potassium ions in the presence of $O_2$ in excess of the stochiometeric requirement to form $K_2SO_4$, thereafter cooling the flue gas stream to temperatures below the melting points of the potassium compounds present condensing the $K_2SO_4$ to form $K_2SO_4$ particulates and depositing $K_2SO_4$ on the surfaces of other particulates present in the flue gas stream, subsequently removing essentially all of the particulates from the flue gas stream prior to the flue gas stream exiting to the atmosphere through a chimney stack, and finally water quenching all the removed particulates permitting hydraulic conveyance of the particulates to regeneration facilities.

2. The method recited in claim 1 wherein the said fuel is a sulfur containing combustible compound or any combination of sulfur containing combustible compounds of the group consisting of coal, oil, shale oil, shale oil sands, lignite, peat and combustible wastes from agriculture, commerce, industry and municipalities.

3. The method recited in claim 1 wherein the $K_2SO_4$ is separated by ion exchange to produce KOH, and the dilute KOH solution is subsequently concentrated and recycled to the spraying zone downstream of the combustion zone.

4. The method recited in claim 1 wherein after water quenching of all removed particulates permitting hydraulic conveyance to the regeneration facilities said particulates are passed through solids separation equipment to effect separation of the insoluble solids from the solubilized $K_2SO_4$.

5. The method recited in claim 4 wherein separation of insoluble solids is effected, and a series of final fresh water elutions reduce the potassium content of the insoluble solids discharging to the environment to environmentally acceptable levels.

6. The method cited in claim 5 wherein the $K_2SO_4$ solubilized by the elution waters is passed through multiple ion exchange resin beds effecting separation of the potassium to produce KOH and effecting separation of the sulfate to produce $(NH_4)_2SO_4$.

7. The method recited in claim 5 wherein the $K_2SO_4$ is separated by ion exchange to produce $(NH_4)_2SO_4$, and the dilute $(NH_4)_2SO_4$ solution is concentrated and dried to acceptable moisture levels before shipment from the regeneration facility.

8. The method recited in claim 1 wherein potassium is lost from the process.

9. The method recited in claim 8 wherein KOH is recycled, and $K_2CO_3$ is added to the concentrated recycled KOH solution, replacing the potassium lost from the system.

10. The method of desulfurizing carbonaceous fuel comprising igniting the fuel in a boiler combustion zone, spraying a saturated solution of potassium carbonate and potassium hydroxide into the flue gas stream immediately downstream of the boiler combustion zone at a temperature sufficiently high to volatilize the potassium compounds of said sprayed solution to an ionic form, reacting the $SO_2$ persent with potassium ions in the flue gas stream in the presence of excess oxygen at a temperature in excess of 1315° C., said sprayed flue gas combining to form potassium sulfate particulates, collecting and removing said particulates dry, along with fly ash particles from the flue gas stream, separating the insoluble ash from the soluble potassium sulfate by water elution, separating the solubilzed potassium sulfate by ion exchange mechanisms, recycling the potassium, as potassium hydroxide, to the head of the system and reacting the sulfate to form ammonium sulfate.

* * * * *